United States Patent
Min

(10) Patent No.: US 12,217,399 B2
(45) Date of Patent: Feb. 4, 2025

(54) TONE MAPPING CIRCUIT, IMAGE SENSING DEVICE AND OPERATION METHOD THEREOF

(71) Applicant: SK hynix Inc., Gyeonggi-do (KR)

(72) Inventor: Chang Ki Min, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 630 days.

(21) Appl. No.: 17/479,229

(22) Filed: Sep. 20, 2021

(65) Prior Publication Data

US 2022/0318955 A1 Oct. 6, 2022

(30) Foreign Application Priority Data

Mar. 31, 2021 (KR) ........................ 10-2021-0041954

(51) Int. Cl.
*G06T 5/70* (2024.01)
*G06T 5/50* (2006.01)

(52) U.S. Cl.
CPC .................. *G06T 5/70* (2024.01); *G06T 5/50* (2013.01); *G06T 2207/10024* (2013.01)

(58) Field of Classification Search
CPC ... G06T 5/70; G06T 5/50; G06T 2207/10024; G06T 5/92; H04N 9/643; H04N 9/646
USPC ................................................. 382/254, 167
See application file for complete search history.

(56) References Cited

U.S. PATENT DOCUMENTS

| | | | |
|---|---|---|---|
| 6,633,683 B1 * | 10/2003 | Dinh ........................ | G06T 5/20 358/463 |
| 7,676,111 B2 * | 3/2010 | Yamauchi ............ | H04N 19/172 382/168 |
| 10,417,752 B2 | 9/2019 | Fors et al. | |
| 2004/0028271 A1 | 2/2004 | Pollard et al. | |
| 2007/0242875 A1 * | 10/2007 | Tanaka ................... | G06V 10/30 382/162 |
| 2011/0249151 A1 * | 10/2011 | Ito ........................ | H04N 23/81 348/241 |
| 2016/0005349 A1 | 1/2016 | Atkins et al. | |
| 2016/0148350 A1 * | 5/2016 | Hong ..................... | H04N 5/213 382/264 |
| 2016/0277721 A1 | 9/2016 | Roffet | |
| 2017/0287116 A1 * | 10/2017 | Senzaki ................... | G06T 5/20 |
| 2018/0152646 A1 * | 5/2018 | Tang ..................... | H04N 25/46 |
| 2019/0251673 A1 * | 8/2019 | Kim ......................... | G06T 5/75 |
| 2020/0202518 A1 * | 6/2020 | Vignon ................ | A61B 8/4245 |

(Continued)

FOREIGN PATENT DOCUMENTS

| | | |
|---|---|---|
| CN | 103533261 A | 1/2014 |
| CN | 204498282 U | 7/2015 |

(Continued)

OTHER PUBLICATIONS

Office Action for the Chinese Patent Application No. 202111633179.0 issued by the Chinese Patent Office on Apr. 27, 2023.

*Primary Examiner* — Kathleen Y Dulaney

(74) *Attorney, Agent, or Firm* — IP & T GROUP LLP

(57) ABSTRACT

A tone mapping circuit includes: a tone mapping unit suitable for generating a corrected color image by correcting an input image corresponding to pixel data provided from a pixel array; and a noise removing unit suitable for calculating a deviation of the input image based on the input image and the corrected color image, and removing noise from the corrected color image to generate a new output image.

11 Claims, 7 Drawing Sheets

(56) References Cited

U.S. PATENT DOCUMENTS

| | | | |
|---|---|---|---|
| 2021/0042887 A1* | 2/2021 | Yoo | G06T 5/60 |
| 2024/0062344 A1* | 2/2024 | Duan | G06T 5/30 |

FOREIGN PATENT DOCUMENTS

| | | |
|---|---|---|
| CN | 106507066 A | 3/2017 |
| CN | 110378846 A | 10/2019 |
| CN | 111226256 A | 6/2020 |
| CN | 111355941 A | 6/2020 |

* cited by examiner

TONE MAPPING CIRCUIT, IMAGE SENSING DEVICE AND OPERATION METHOD THEREOF

CROSS-REFERENCE TO RELATED APPLICATIONS

The present application claims priority to Korean Patent Application No. 10-2021-0041954, filed on Mar. 31, 2021, which is incorporated herein by reference in its entirety.

BACKGROUND

1. Field

Various embodiments of the present invention relate to semiconductor designing technology, and more particularly, to a tone mapping circuit, an image sensing device, and an operation method thereof.

2. Description of the Related Art

Recently, the paradigm for a computer environment is shifting into ubiquitous computing, which allows users to access computer systems anywhere and anytime. The paradigm shift rapidly increases the use of portable electronic devices, such as mobile phones, digital cameras, laptop computers and the like.

In particular, with the rapid development of imaging devices, the development for image photographing devices, such as cameras and camcorders equipped with image sensors, is accelerating. Since an image photographing apparatus is not only capable of capturing images and recording them in a recording medium but also reproducing the images at any time, the number of users is increasing rapidly. This also gradually increases the users' demands for performance and functions, and high performance and multi-functionalization are being pursued along with miniaturization, light weight, and low power consumption.

A high dynamic range (HDR) image is an image including diverse grayscale variations (variations from the darkest region to the brightest region). An HDR image contains a large amount of information, and color correction for a color image is required to efficiently process the HDR image.

SUMMARY

Embodiments of the present invention are directed to providing a tone mapping circuit, an image sensing device, and a method of driving the same for effectively suppressing or removing noise of a color-corrected image by processing to maintain a deviation of an input image.

The technical problems to be solved in the embodiments of the present invention are not limited to the technical problems mentioned above, and other technical problems not mentioned will be clearly understood by those of ordinary skill in the art to which the present invention pertains from the description below.

In accordance with an embodiment of the present invention, a tone mapping circuit includes: a tone mapping component suitable for generating a corrected color image by correcting pixel data representing an input image provided from a pixel array; and a noise removing component suitable for calculating a deviation of the input image and removing a noise from the corrected color image, based on the input image and the corrected color image, to generate an output image.

In accordance with another embodiment of the present invention, a tone mapping circuit includes: a first tone mapping component suitable for generating a primarily corrected color image by correcting pixel data representing an input image provided from a pixel array; and a second tone mapping component suitable for generating a secondarily corrected color image by secondarily correcting the primarily corrected color image based on the input image and the primarily corrected color image.

In accordance with yet another embodiment of the present invention, an image sensing device includes: an image sensor having a plurality of pixels; and an image signal processor suitable for processing an output signal of the image sensor, wherein one of the image sensor and the image signal processor includes a tone mapping circuit, and wherein the tone mapping circuit includes: a tone mapping component suitable for generating a corrected color image by correcting pixel data representing an input image provided from the plurality of pixels; and a noise removing component suitable for calculating a deviation of the input image and removing a noise from the corrected color image, based on the input image and the corrected color image, to generate an output image.

The noise removing component may calculate the deviation by calculating a mean value of the pixel data, wherein the noise removing component is further suitable for calculating a mean value of the corrected color image, and wherein the noise removing component removes the noise from the corrected image by adding the deviation of the input image to the mean value of the corrected color image.

The noise removing component may calculate the deviation of the input image by subtracting the mean value of the pixel data from each piece of the pixel data.

In accordance with still another embodiment of the present invention, an image sensing device includes: an image sensor having a plurality of pixels; and an image signal processor suitable for processing an output signal of the image sensor, wherein one of the image sensor and the image signal processor includes a tone mapping circuit, and wherein the tone mapping circuit includes: a first tone mapping component suitable for generating a primarily corrected color image by correcting pixel data representing an input image provided from the plurality of pixels; and a second tone mapping component suitable for generating a secondarily corrected color image by secondarily correcting the primarily corrected color image based on the input image and the primarily corrected color image.

The second tone mapping component may secondarily correct the primarily corrected image by removing a noise from the primarily corrected color image.

The second tone mapping component may be further suitable for: calculating a mean value of the pixel data, calculating a deviation of the input image, and calculating a mean value of the primarily corrected color image, and wherein the second tone mapping circuit generates the secondarily corrected color image by adding the deviation of the input image to the mean value of the primarily corrected color image.

The second tone mapping component may calculate the deviation of the input image by subtracting the mean value of the pixel data from each piece of the pixel data.

In accordance with still another embodiment of the present invention, a method for driving an image sensing device includes: generating a corrected color image based on a weight matrix and pixel data representing an input image provided from a pixel array; and generating an output image by removing a noise from the corrected color image based on the input image and the corrected color image.

In accordance with still another embodiment of the present invention, a method for driving an image sensing device includes: generating a corrected array of pixel data based on a weight matrix and an original array of the pixel data; calculating mean values of the respective original and corrected arrays; generating a deviation array of the original array by subtracting the mean value of the original array from respective data pieces within the original array; and generating an output array of the pixel data by summing the mean value of the corrected array to the deviation array.

DETAILED DESCRIPTION

Figure 1:
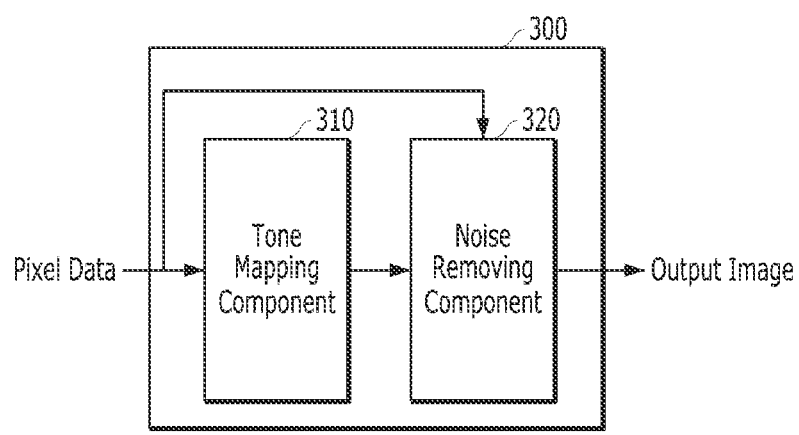
FIG. 1 is a block diagram illustrating a tone mapping circuit in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that when an element is referred to as being "coupled" or "connected" to another element, it may mean that the two are directly coupled or electrically connected to each other with another circuit intervening therebetween. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

Hereinafter, referring to FIGS. 1 and 2, a tone mapping circuit in accordance with an embodiment of the present invention is described. FIG. 1 is a block diagram illustrating a tone mapping circuit in accordance with an embodiment of the present invention, and FIG. 2 illustrates an operation of the tone mapping circuit shown in FIG. 1 in accordance with an embodiment of the present invention.

The tone mapping circuit 300 illustrated in FIG. 1 may include a tone mapping component 310 and a noise removing component 320. The tone mapping component 310 and the noise removing component 320 include all circuits, systems, software, firmware and devices necessary for their respective operations and functions. In an embodiment of the present invention, 5×5 pixel data will be taken as an example and described.

The tone mapping component 310 may generate a corrected color image $R'_{5\times5}$, $G'_{5\times5}$ and $B'_{5\times5}$ by correcting an input image corresponding to the pixel data $R_{5\times5}$, $G_{5\times5}$ and $B_{5\times5}$ provided from a pixel array.

Figure 2:
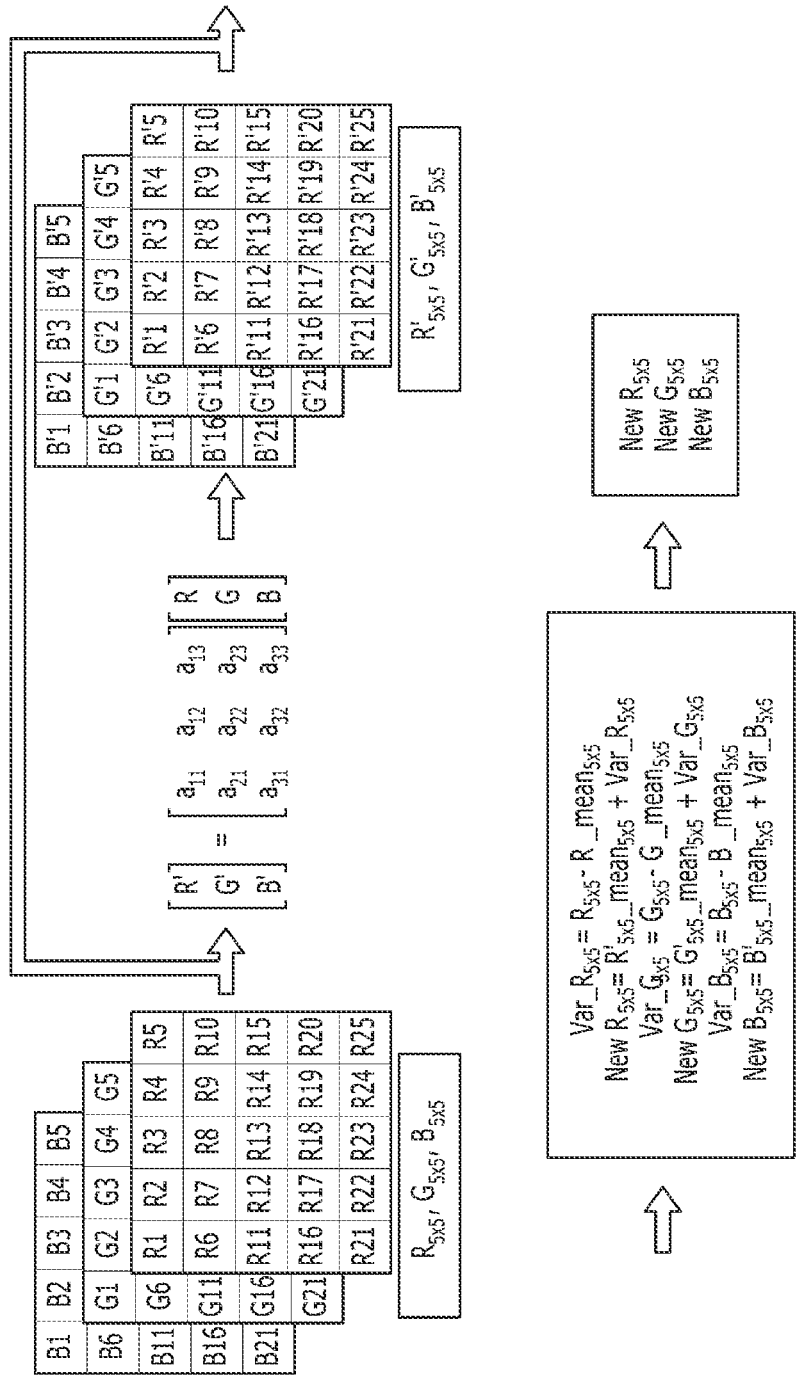
FIG. 2 illustrates an operation of the tone mapping circuit shown in FIG. 1 in accordance with an embodiment of the present invention.

Herein, as illustrated in FIG. 2, the tone mapping component 310 may correct the input image of red pixels $R_{5\times5}$, green pixels $G_{5\times5}$, and blue pixels $B_{5\times5}$ by using a weight matrix to generate a corrected color image $R'_{5\times5}$, $G'_{5\times5}$ and $B'_{5\times5}$, respectively.

The noise removing component 320 may generate an output image New $R_{5\times5}$, NEW $G_{5\times5}$, and New $B_{5\times5}$ by maintaining the deviation $Var\_R_{5\times5}$, $Var\_G_{5\times5}$, and $Var\_B_{5\times5}$ of the input image $R_{5\times5}$, $G_{5\times5}$ and $B_{5\times5}$ and removing a noise from the corrected color image $R'_{5\times5}$, $G'_{5\times5}$ and $B'_{5\times5}$ based on the input image $R_{5\times5}$, $G_{5\times5}$ and $B_{5\times5}$ and the corrected color image $R'_{5\times5}$, $G'_{5\times5}$ and $B'_{5\times5}$.

Herein, the deviation $Var\_R_{5\times5}$, $Var\_G_{5\times5}$, and $Var\_B_{5\times5}$ of the pixel data $R_{5\times5}$, $G_{5\times5}$ and $B_{5\times5}$ (i.e., the input image) may be calculated by subtracting, from the pixel data $R_{5\times5}$, $G_{5\times5}$ and $B_{5\times5}$, the mean values $R\_mean_{5\times5}$, $G\_mean_{5\times5}$, and $B\_mean_{5\times5}$ of the pixel data $R_{5\times5}$, $G_{5\times5}$ and $B'_{5\times5}$. For example, the deviation $Var\_R13$, $Var\_G13$, and $Var\_B13$ of the center pixel data R13, G13 and B13 within the pixel data $R_{5\times5}$, $G_{5\times5}$ and $B_{5\times5}$ may be calculated by subtracting, from the center pixel data R13, G13 and B13, the mean values $R\_mean_{5\times5}$, $G\_mean_{5\times5}$, and $B\_mean_{5\times5}$ of the pixel data $R_{5\times5}$, $G_{5\times5}$ and $B_{5\times5}$. In this way, the deviation $Var\_R_{5\times5}$, $Var\_G_{5\times5}$, and $Var\_B_{5\times5}$ of the pixel data $R_{5\times5}$, $G_{5\times5}$ and $B_{5\times5}$ may be calculated through the pixel by pixel approach.

To be specific, the noise removing component 320 may calculate the mean values $R\_mean_{5\times5}$, $G\_mean_{5\times5}$, and $B\_mean_{5\times5}$ of the pixel data $R_{5\times5}$, $G_{5\times5}$ and $B_{5\times5}$ input from the pixel array, and calculate the deviation $Var\_R_{5\times5}$, $Var\_G_{5\times5}$, and $Var\_B_{5\times5}$ of the input image $R_{5\times5}$, $G_{5\times5}$ and $B_{5\times5}$. Subsequently, the mean values $R'\_mean_{5\times5}$, $G'\_mean_{5\times5}$, and $B'\_mean_{5\times5}$ may be calculated from the corrected color image $R'_{5\times5}$, $G'_{5\times5}$ and $B'_{5\times5}$ corrected by the tone mapping component 310, and new output image New $R_{5\times5}$, NEW $G_{5\times5}$, and New $B_{5\times5}$ obtained by removing a noise from the corrected image $R'_{5\times5}$, $G'_{5\times5}$ and $B'_{5\times5}$ may be created by adding the deviation $Var\_R_{5\times5}$, $Var\_G_{5\times5}$, and $Var\_B_{5\times5}$ of the input image $R_{5\times5}$, $G_{5\times5}$ and $B_{5\times5}$ to the mean values $R'\_mean_{5\times5}$, $G'\_mean_{5\times5}$, and $B'\_mean_{5\times5}$ of the corrected color image $R'_{5\times5}$, $G'_{5\times5}$ and $B'_{5\times5}$.

Also, according to another embodiment of the present invention, the noise removing component 320 may compare the deviation $Var\_R_{5\times5}$, $Var\_G_{5\times5}$, and $Var\_B_{5\times5}$ of an input image $R_{5\times5}$, $G_{5\times5}$ and $B_{5\times5}$ with the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5}$, and only when the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5}$ is less than the deviation $Var\_R_{5\times5}$, $Var\_G_{5\times5}$, and $Var\_B_{5\times5}$ of the input image $R_{5\times5}$, $G_{5\times5}$ and $B_{5\times5}$, it may generate an output image New $R_{5\times5}$, NEW $G_{5\times5}$, and New $B_{5\times5}$ obtained by removing a noise from the corrected image $R'_{5\times5}$, $G'_{5\times5}$ and $B'_{5\times5}$ by adding the deviation $Var\_R_{5\times5}$, $Var\_G_{5\times5}$, and $Var\_B_{5\times5}$ of the input image $R_{5\times5}$, $G_{5\times5}$ and $B_{5\times5}$ to the mean value $R'\_mean_{5\times5}$, $G'\_mean_{5\times5}$, and $B'\_mean_{5\times5}$ of the corrected color image $R'_{5\times5}$, $G'_{5\times5}$ and $B'_{5\times5}$. That is, when the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5}$ is greater than the deviation $Var\_R_{5\times5}$, $Var\_G_{5\times5}$, and $Var\_B_{5\times5}$ of the input image $R_{5\times5}$, $G_{5\times5}$ and $B_{5\times5}$, an output image New $R_{5\times5}$, NEW $G_{5\times5}$, and New $B_{5\times5}$ may not be generated.

Hereinafter, a tone mapping circuit 500 in accordance with another embodiment of the present invention will be described with reference to FIG. 3, which is a block diagram illustrating the tone mapping circuit 500 in accordance with another embodiment of the present invention.

Figure 3:
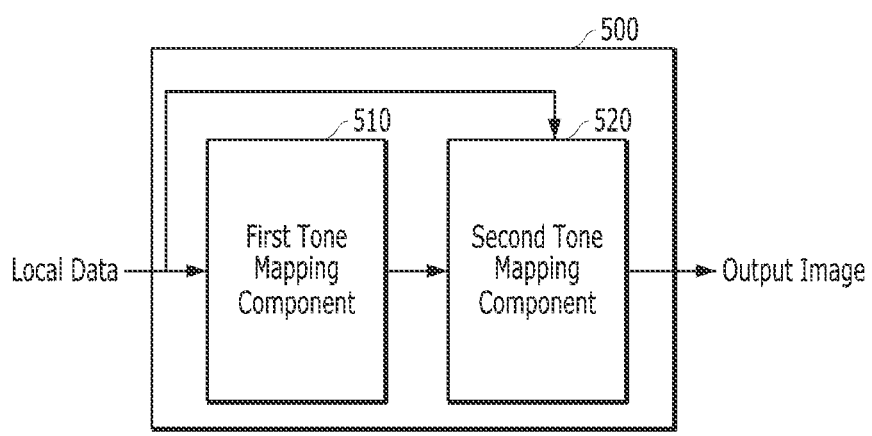
FIG. 3 is a block diagram illustrating a tone mapping circuit in accordance with another embodiment of the present invention.

The tone mapping circuit 500 in accordance with another embodiment of the present invention illustrated in FIG. 3 may include a first tone flapping component 510 and a second tone mapping component 520. In the embodiment of the present invention, 5×5 pixel data will be taken as an example and described. The first tone mapping component 510 and the second tome mapping component 520 include all circuits, systems, software, firmware and devices necessary for their respective operations and functions.

The first tone mapping component 510 may generate a primarily corrected color image $R'_{5\times5}$, $G'_{5\times5}$ and $B'_{5\times5}$ by correcting an input image $R_{5\times5}$, $G_{5\times5}$ and $B_{5\times5}$ corresponding to the pixel data provided from the pixel array.

Herein, as illustrated in FIG. 2, the first tone mapping component 510 may correct red pixels $R_{5\times5}$, green pixels $G_{5\times5}$, and blue pixels $B_{5\times5}$ of an input image $R_{5\times5}$, $G_{5\times5}$ and $B_{5\times5}$ by using a weight matrix to generate the primarily corrected color image $R'_{5\times5}$, $G'_{5\times5}$ and $B'_{5\times5}$.

The second tone mapping component 520 may secondarily correct the primarily corrected color image $R'_{5\times5}$, $G'_{5\times5}$ and $B'_{5\times5}$ based on the input image $R_{5\times5}$, $G_{5\times5}$ and $B_{5\times5}$ and the primarily corrected color image $R_{5\times5}'$, $G'_{5\times5}$ and $B'_{5\times5}$ so as to generate a secondarily corrected color image New $R_{5\times5}$, NEW $G_{5\times5}$, and New $B_{5\times5}$.

Herein, the secondarily corrected color image New $R_{5\times5}$, New $G_{5\times5}$, and New $B_{5\times5}$ may be obtained by removing a noise from the primarily corrected color images $R'_{5\times5}$, $G'_{5\times5}$ and $B'_{5\times5}$ and may be output.

Also, the deviation $Var\_R_{5\times5}$, $Var\_G_{5\times5}$, and $Var\_B_{5\times5}$ of the pixel data $R_{5\times5}$, $G_{5\times5}$ and $B_{5\times5}$ (i.e., the input image) may be calculated by subtracting, from the pixel data $R_{5\times5}$, $G_{5\times5}$ and $B_{5\times5}$, the mean values $R\_mean_{5\times5}$, $G\_mean_{5\times5}$, and $B\_mean_{5\times5}$ of the pixel data $R_{5\times5}$, $G_{5\times5}$ and $B_{5\times5}$. For example, the deviation $Var\_R13$, $Var\_G13$, and $Var\_B13$ of the center pixel data R13, G13 and B13 within the input image $R_{5\times5}$, $G_{5\times5}$ and $B_{5\times5}$ may be calculated by subtracting, from the center pixel data R13, G13 and B13, the mean values $R'\_mean_{5\times5}$, $G'\_mean_{5\times5}$, and $B'\_mean_{5\times5}$ of the pixel data $R_{5\times5}$, $G_{5\times5}$ and $B_{5\times5}$. In this way, the deviation $Var\_R_{5\times5}$, $Var\_G_{5\times5}$ and $Var\_B_{5\times5}$ of the pixel data $R_{5\times5}$; $G_{5\times5}$ and $B_{5\times5}$ may be calculated through the pixel by pixel approach.

To be specific, the second tone mapping component 520 may calculate the mean values $R\_mean_{5\times5}$, $G\_mean_{5\times5}$, and $B\_mean_{5\times5}$ of the pixel data $R_{5\times5}$, $G_{5\times5}$ and $B_{5\times5}$ and calculate the deviation $Var\_R_{5\times5}$, $Var\_G_{5\times5}$, and $Var\_B_{5\times5}$ of the input image $R_{5\times5}$, $G_{5\times5}$ and $B_{5\times5}$. Then, it may calculate the mean values $R'\_mean_{5\times5}$, $G'\_mean_{5\times5}$, and $B'\_mean_{5\times5}$ of the primarily corrected color image $R'_{5\times5}$, $G'_{5\times5}$ and B'5×5 corrected by the first tone mapping component 510, and generate a secondarily corrected color image New $R_{5\times5}$, NEW $G_{5\times5}$, and New $B_{5\times5}$ by adding the deviation $Var\_R_{5\times5}$, $Var\_G_{5\times5}$, and $Var\_B_{5\times5}$ of the input image $R_{5\times5}$, $G_{5\times5}$ and $B_{5\times5}$ to the mean values $R'\_mean_{5\times5}$, $G'\_mean_{5\times5}$, and $B'\_mean_{5\times5}$ of the primarily corrected color image $R'_{5\times5}$, $G'_{5\times5}$ and $B'_{5\times5}$.

Also, according to another embodiment of the present invention, the second tone mapping component 520 may compare the deviation $Var\_R_{5\times5}$, $Var\_G_{5\times5}$, and $Var\_B_{5\times5}$ of the input image $R_{5\times5}$, $G_{5\times5}$ and $B_{5\times5}$ with the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5}$, and only when the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5}$ is less than the deviation $Var\_R_{5\times5}$, $Var\_G_{5\times5}$, and $Var\_R_{5\times5}$ of the input image $R_{5\times5}$, $G_{5\times5}$ and $B_{5\times5}$, may generate an output image New $R_{5\times5}$, NEW $G_{5\times5}$, and New $B_{5\times5}$ obtained by removing a noise from the corrected image $R'_{5\times5}$, $G'_{5\times5}$ and $B'_{5\times5}$ by adding the deviation $Var\_R_{5\times5}$, $Var\_G_{5\times5}$, and $Var\_B_{5\times5}$ of the input image $R_{5\times5}$, $G_{5\times5}$ and $B_{5\times5}$ to the mean values $R'\_mean_{5\times5}$, $G'\_mean_{5\times5}$, and $B'\_mean_{5\times5}$ of the corrected color image $R'_{5\times5}$, $G'_{5\times5}$ and $B'_{5\times5}$. That is, when the deviation $Var\_R'_{5\times5}$, $Var\_G'_{5\times5}$, and $Var\_B'_{5\times5}$ of the corrected color image $R'_{5\times5}$, $G'_{5\times5}$ and $B'_{5\times5,}$ is greater than the deviation $Var\_R_{5\times5}$, $Var\_G_{5\times5}$, and $Var\_B_{5\times5}$ of the input image $R_{5\times5}$, $G_{5\times5}$ and $B_{5\times5}$, it may not generate an output image New $R_{5\times5}$, NEW $G_{5\times5}$, and New $B_{5\times5}$.

Figure 4:
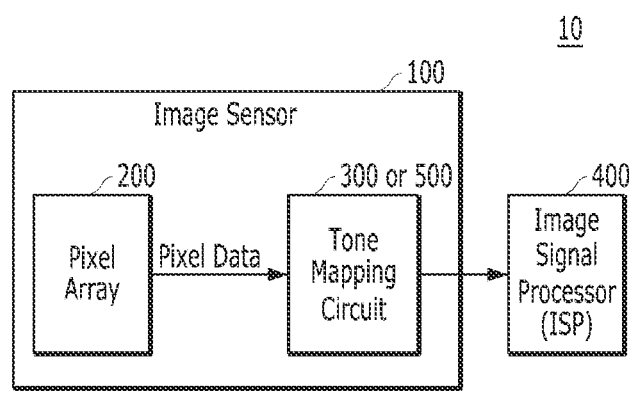
FIG. 4 is a block diagram illustrating an image sensing device in accordance with the embodiment of the present invention.

Hereinafter, referring to FIG. 4, an image sensing device in accordance with an embodiment of the present invention will be described. FIG. 4 is a block diagram illustrating an image sensing device in accordance with an embodiment of the present invention.

Referring to FIG. 4, the image sensing device 10 may include an image sensor 100 and an image signal processor (ISP) 400.

The image sensing device 10 may be realized as a personal computer (PC) or a mobile computing device. The image sensing device may include a laptop computer, a mobile phone, a smart phone, a tablet PC, a Personal Digital Assistant (PDA), an Enterprise Digital Assistant (EDA), a digital still camera, a digital video camera, a portable multi-media player (PMP), a mobile internet device (MID), a wearable computer, an Internet of Things (IOT) device, or an Internet of Everything (IoE) device.

The image sensor 100 illustrated in FIG. 4 may include a pixel array 200 and a tone mapping circuit 300 or 500.

The pixel array 200 may include a plurality of pixels. Here, a pixel may mean pixel data, and may have an RGB data format, a YUV data format, or a YCbCr data format, but the concept and spirit of the present invention are not limited thereto.

The tone mapping circuit 300 or 500 may remove a noise from the corrected color image while maintaining the deviation of the input image based on the input image and the corrected color image obtained by correcting the image input from the pixel array 200 having a plurality of pixels.

Since the structure and operation of the tone mapping circuit 300 or 500 illustrated in FIG. 4 are the same as the structure and operation of the tone mapping circuit 300 or 500 illustrated in FIGS. 1 to 3, a detailed description thereof will be omitted.

The image signal processor 400 may be realized as an integrated circuit, a System On Chip (SoC), or a mobile AP as an embodiment of a processor. The image signal processor 400 may process the output signal of the image sensor 100. The image signal processor 400 may receive and process the image output signal which is output from the tone mapping circuit 300 provided in the image sensor 100.

To be specific, the image signal processor 400 may generate RGB image data by processing a Bayer pattern BAYER corresponding to pixel data. For example, the image signal processor 400 may process the Bayer pattern BAYER so that the image data IDATA may be displayed on a display, and transfer the processed image data to an interface.

According to an embodiment, each of the image sensor 100 and the image signal processor 400 may be realized as a chip, and may be realized as a single package, for example, a multi-chip package (MCP). According to another embodiment of the present invention, the image sensor 100 and the image signal processor 400 may be realized as a single chip.

Figure 5:
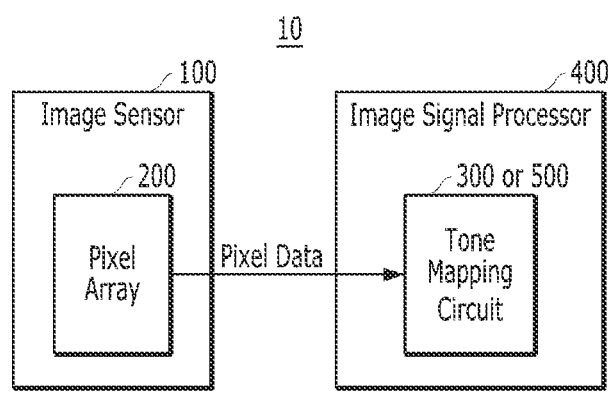
FIG. 5 is a block diagram illustrating an image sensing device in accordance with another embodiment of the present invention.

Hereinafter, referring to FIG. 5, an image sensing device in accordance with another embodiment of the present invention will be described. FIG. 5 is a block diagram illustrating an image sensing device 10 in accordance with another embodiment of the present invention.

Referring to FIG. 5, the image sensing device 10 may include an image sensor 100 and an image signal processor (ISP) 400.

Except that the tone mapping circuit 300 or 500 is not realized in the image sensor 100 but is realized in the image signal processor 400, the structure and operation of the image sensing device 10 shown in FIG. 5 are substantially the same or similar to the structure and operation of the image sensing device 10 shown in FIG. 4, thus, a detailed description thereof will be omitted.

Figure 6:
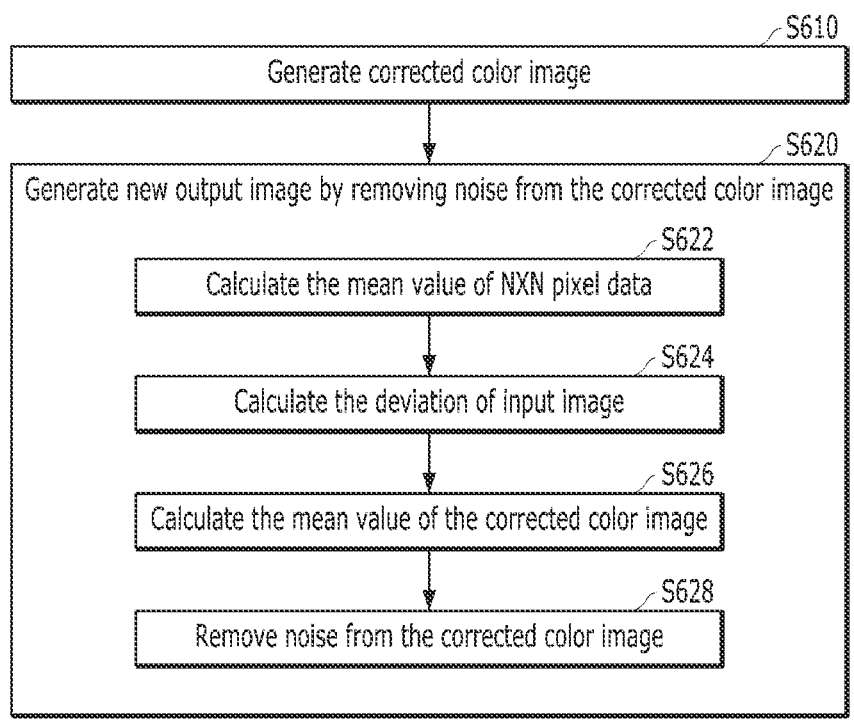
FIG. 6 is a flowchart describing an operation of an image sensing device in accordance with another embodiment of the present invention.

Hereinafter, referring to FIG. 6, a method for operating an image sensing device in accordance with an embodiment of the present invention will be described. FIG. 6 is a flowchart describing an operation of an image sensing device in accordance with another embodiment of the present invention.

Referring to FIG. 6, the operation of the image sensing apparatus in accordance with the embodiment of the present invention may include generating a corrected color image $R'_{N \times N}$, $G'_{N \times N}$ and $B'_{N \times N}$ (S610) and generating an output image New $R_{N \times N}$, NEW $G_{N \times N}$, and New $B_{N \times N}$ by removing a noise from the corrected color image $R'_{N \times N}$, $G'_{N \times N}$ and $B'_{N \times N}$ (S620).

In operation S610, a tone mapped image $R'_{N \times N}$, $G'_{N \times N}$ and $B'_{N \times N}$ may be generated by using a weight matrix for each pixel data corresponding to an input image $R_{N \times N}$, $G_{N \times N}$ and $B_{N \times N}$ provided from the pixel array.

In operation S620, an output image New $R_{N \times N}$, NEW $G_{N \times N}$, and New $B_{N \times N}$ may be generated by removing a noise from the corrected color image $R'_{N \times N}$, $G'_{N \times N}$ and $B'_{N \times N}$ based on the input image $R_{N \times N}$, $G_{N \times N}$ and $B_{N \times N}$ and the corrected color image $R'_{N \times N}$, $G'_{N \times N}$ and $B'_{N \times N}$.

To describe the operation S620 in more detail, operation S620 may include calculating the mean value mean values $R\_mean_{N \times N}$, $G\_mean_{N \times N}$, and $B\_mean_{N \times N}$ of the pixel data $R_{N \times N}$, $G_{N \times N}$ and $B_{N \times N}$ (S622), calculating the deviation $Var\_R_{N \times N}$, $Var\_G_{N \times N}$, and $Var\_B_{N \times N}$ of the input image $R_{N \times N}$, $G_{N \times N}$ and $B_{N \times N}$ (S624), calculating the mean value $R'\_mean_{N \times N}$, $G'\_mean_{N \times N}$, and $B'\_mean_{N \times N}$ of the corrected color image $R'_{N \times N}$, $G'_{N \times N}$ and $B'_{N \times N}$ (S626), and removing a noise of the color corrected image $R'_{N \times N}$, $G'_{N \times N}$ and $B'_{N \times N}$ (S628).

In operation S622, the mean value mean values $R\_mean_{N \times N}$, $G\_mean_{N \times N}$, and $B\_mean_{N \times N}$ of the pixel data $R_{N \times N}$, $G_{N \times N}$ and $B_{N \times N}$ input from the pixel array may be calculated.

In operation S624, the deviation $Var\_R_{N \times N}$, $Var\_G_{N \times N}$, and $Var\_B_{N \times N}$ of the input image $R_{N \times N}$, $G_{N \times N}$ and $B_{N \times N}$ may be calculated by subtracting, from the pixel data $R_{N \times N}$, $G_{N \times N}$ and $B_{N \times N}$, the mean value mean values $R\_mean_{N \times N}$, $G\_mean_{N \times N}$, and $B\_mean_{N \times N}$ of the pixel data $R_{N \times N}$, $G_{N \times N}$ and $B_{N \times N}$.

In operation S626, the mean value $R'\_mean_{N \times N}$, $G'\_mean_{N \times N}$, and $B'\_mean_{N \times N}$ of the corrected color image $R'_{N \times N}$, $G'_{N \times N}$ and $B'_{N \times N}$ may be calculated.

In operation S628, an output image New $R_{N \times N}$, NEW $G_{N \times N}$, and New $B_{N \times N}$ obtained by removing a noise from the corrected color image $R'_{N \times N}$, G'N×N and $B'_{N \times N}$ may be output by adding the deviation $Var\_R_{N \times N}$, $Var\_G_{N \times N}$, and $Var\_B_{N \times N}$ to the mean value $R'\_mean_{N \times N}$, $G'\_mean_{N \times N}$, and $B'\_mean_{N \times N}$ of the corrected color image $R'_{N \times N}$, $G'_{N \times N}$ and $B'_{N \times N}$.

Figure 7:
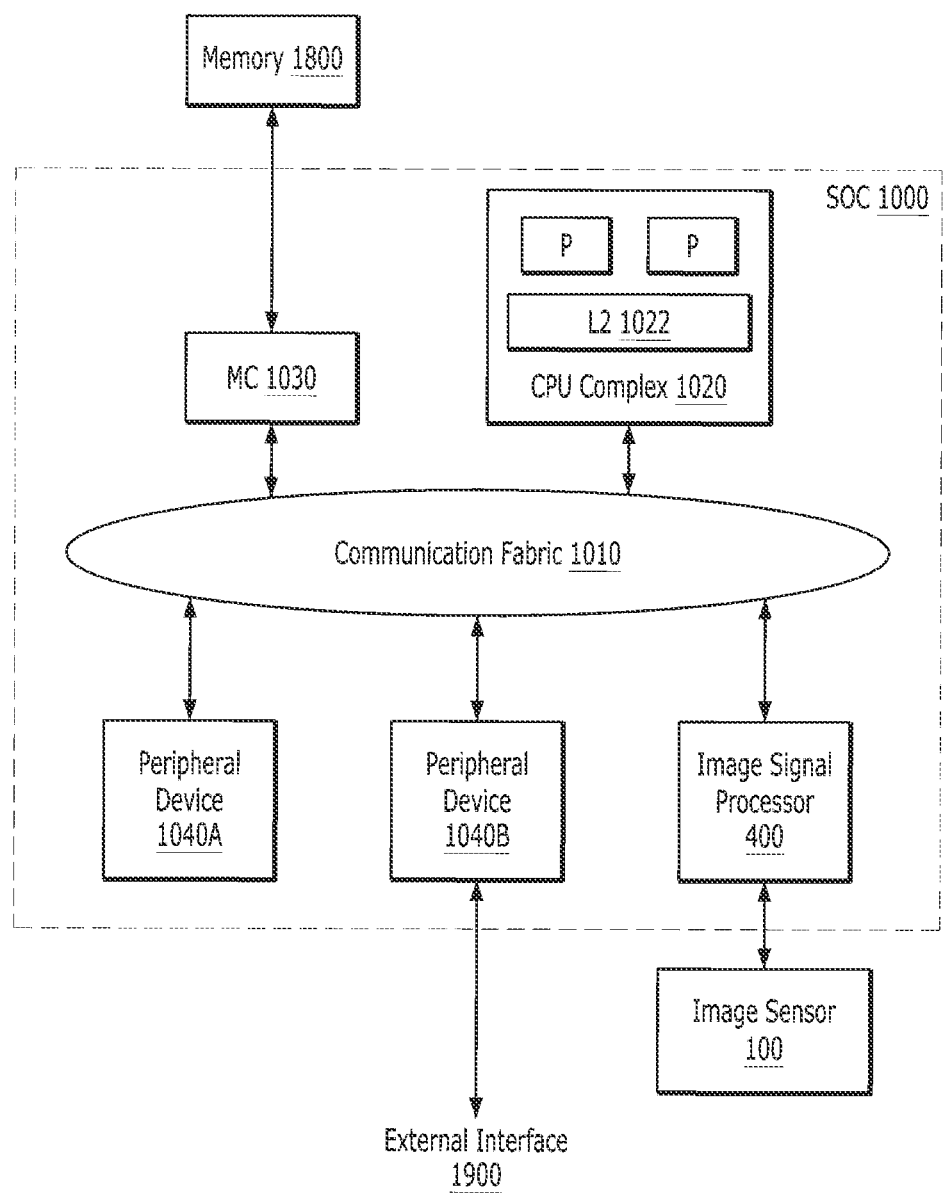
FIG. 7 is a block diagram illustrating an embodiment of a system to which an image sensing device in accordance with an embodiment of the present invention is applied.

Hereinafter, referring to FIG. 7, an embodiment of a system to which an image sensing device in accordance with an embodiment of the present invention is applied will be described. FIG. 7 is a block diagram illustrating an embodiment of a system to which an image sensing device in accordance with an embodiment of the present invention is applied.

The system illustrated in FIG. 7 may be one of a personal computer system, a desktop computer, a laptop computer, a mainframe computer system, a handheld computing device, a cellular phone, a smart phone, a mobile phone, a workstation, a network computer, a consumer device, an application server, a storage device, an intelligent display, peripheral devices such as a switch, a modem, a router, etc., and general types of computing devices, but the present invention is not limited thereto and the system illustrated in FIG. 7 may be one of diverse types of computing devices.

The system illustrated in FIG. 7 may represent a System-On-a-Chip (SOC). As the name implies, the components of an SOC 1000 may be integrated over a single semiconductor substrate, such as the integrated circuit 'chips'. According to some embodiments of the present invention, the components may be realized over two or more separate chips in a system. Herein, the SOC 1000 will be used as an example.

According to an embodiment of the present invention, the components of the SOC 1000 may include a Central Processing Unit (CPU) complex 1020, On-Chip peripheral device components 1040A and 1040B (which may be simply referred to as 'peripheral devices'), a memory controller (MC) 1030, an image signal processor 400, and a communication fabric 1010.

The SOC 1000 may also be coupled to additional components, such as a memory 1800 and an image sensor 100. All of the components 1020, 1030, 1040A and 10408, and 400 may be coupled to the communication fabric 1010. The memory controller 1030 may be coupled to the memory 1800 while it is being used, and the peripheral device 10408 may be coupled to an external interface 1900 while being used.

In an embodiment of the present invention, the CPU complex 1020 may include one or more processors 1024 and a level-2 cache L2 1022. The peripheral devices 1040A and 10408 may be a set of additional hardware functions included in the SOC 1000. For example, the peripheral devices 1040A and 1040B may include display controllers, Graphics Processing Units (GPUs), video encoders/decoders, scalers, rotators, blenders, etc., that are formed to display video data on one or more display devices.

The image signal processor 400 may process image capture data from the image sensor 100 (or another image sensor). As for the structure and operation of the image signal processor 400 and the image sensor 100, the structures and operations of the image signal processor 400 and the image sensor 100 shown in FIGS. 1 to 6 may be referred to.

The peripheral devices may also include audio peripheral devices, such as microphones, speakers, interfaces with microphones and speakers, audio processors, digital signal processors, mixers, etc. The peripheral devices may include peripheral device interface controllers (for example, a peripheral device 1040B) for diverse interfaces 1900 in the outside of the SOC 1000 including Universal Serial Bus (USB), Peripheral Component Interconnect (PCI) including PCI Express (PCIe), serial and parallel ports, and the like. The peripheral devices may further include networking peripheral devices, such as media access controllers (MACs).

The CPU complex 1020 may include one or more CPU processors 1024 serving as a CPU of the SOC 1000. The CPU of the system may include processor(s) executing a main control software of a system, e.g., an operating system. In general, software executed by the CPU during an operation may control the other components of the system to realize a predetermined function of the system. The processors 1024 may also execute other software, such as application programs. Application programs may provide a user with functions and may depend on the operating system for low-level device control. Accordingly, the processors 1024 may also be referred to as application processors.

The CPU complex 1020 may further include other hardware, such as an L2 cache 1022 and/or interfaces for other components of the system (e.g., interfaces for the communication fabric 1010).

Generally, a processor may include an arbitrary circuit and/or a microcode that is formed to execute commands defined in a command set architecture realized by a processor. Although the commands and data that are executed by processors may be generally stored in the memory 1800 in response to the execution of the commands, predetermined commands may also be defined for direct processor access to peripheral devices. The processors may include processor cores realized on an integrated circuit along with other components as a System-On-Chip (SOC 1000) or integration of other levels. The processors may further include separate microprocessors, microprocessors integrated in processor cores and/or multi-chip module implementations, processors realized as multiple integrated circuits, and the like.

The memory controller 1030 may include a circuit that generally receives memory operation commands from the other components of the SOC 1000 and accesses the memory 1800 to complete the memory operations. The memory controller 1030 may be formed to access the memory 1800 which is an arbitrary type. For example, the memory 1800 may be a Static Random Access Memory (SRAM), or a Synchronous Dynamic Random Access Memory (SDRAM) including a DRAM such as Double Data Rate DRAM (DDR, DDR2, DDR3, etc.). Low power/mobile versions of DDR DRAM (e.g., LPDDR, mDDR, etc.) may be supported. The memory controller 1030 may include queues for memory operations that direct (and potentially redirect) and present operations to the memory 1800. The memory controller 1030 may further include data buffers that store write data waiting to be written into the memory and read data waiting to return into the source of the memory operation.

According to some embodiments of the present invention, the memory controller 1030 may include a memory cache that stores recently accessed memory data. In the implementation of the SOC, the memory cache may reduce the power ratio in the SOC by avoiding re-accessing the data from the memory 1800 when it is expected to be accessed again soon. In some cases, the memory cache may be referred to as a system cache, such as private caches that support only predetermined components, e.g., the L2 cache 1022 of the processors 1024. According to some embodiments of the present invention, the system cache may not have to be positioned in the inside of the memory controller 1030.

According to the embodiment of the present invention, the memory 1800 may be packaged along with the SOC 1000 in the form of a chip-on-chip or package-on-package. A multi-chip module structure of the SOC 1000 and the memory 1800 may also be used.

Thus, while protection data may be stored unencrypted in the memory 1800, the protection data may be encrypted to be exchanged between the SOC 1000 and external endpoints.

The communication fabric 1010 may be an arbitrary communication interconnect and protocol for communication among the components of the SOC 1000. The communication fabric 1010 may be based on a bus including hierarchical buses with shared bus elements, cross bar elements, and bridges. The communication fabric 1010 may also be based on packets and it may be a layer with a bridge, a cross bar, a point-to-point connection, or other interconnects.

The methods described in this specification may be realized by a computer program product, or software. According to some embodiments of the present invention, a non-transitory computer-readable storage medium may program a computer system (or other electronic devices) and may store commands that may be used to execute some or all of the techniques described herein. A computer-readable storage medium may include an arbitrary mechanism for storing information in a form (e.g., software and processing application) readable by machine (e.g., a computer). The machine-readable medium may include a magnetic storage medium (e.g., a floppy diskette); an optical storage medium (e.g., CD-ROM); a magneto-optical storage medium; a Read Only Memory (ROM); a Random Access Memory (RAM); an Erasable and programmable memory (e.g., EPROM and EEPROM); a flash memory; and other types of media appropriate for storing electricity or program commands, but the concept and spirit of the present invention are not limited thereto. In addition, the program commands may be communicated by using light, sound, or other forms of propagated signals (e.g., carrier waves, infrared signals, digital signals, etc.).

The computer system 1000 may include one or more modules, for example, a processor unit 1020 (possibly multiple processors, a single-threaded processor, a multi-threaded processor, a multi-core processor, etc.) that may exist in the program commands stored in the memory 1800 of the same computer system, or that may exist in the program commands stored in the memory of a system which is similar to or different from the computer system 1000 to execute a tone mapping circuit.

According to an embodiment of the present invention, a tone mapping circuit, an imaging sensing device, and an operation method thereof in accordance with an embodiment of the present invention are capable of removing a noise from a corrected color image which is obtained by correcting an input image while maintaining a deviation of the input image based on the corrected color image and the input image.

The effects that may be obtained in the embodiments of the present invention are not limited to the above-mentioned effects, and other effects not mentioned will be dearly understood by those of ordinary skill in the art to which the present invention pertains from the following description.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A tone mapping circuit, comprising:
a tone mapping component configured to generate a corrected color image by correcting pixel data representing an input image provided from a pixel array; and
a noise removing component configured to calculate a deviation of the input image and remove a noise from the corrected color image, based on the input image and the corrected color image, to generate an output image,
wherein the noise removing component calculates the deviation by calculating a mean value of the pixel data,
wherein the noise removing component is further suitable for calculating a mean value of the corrected color image, and
wherein the noise removing component removes the noise from the corrected color image by adding the deviation of the input image to the mean value of the corrected color image.

2. The tone mapping circuit of claim 1, wherein the tone mapping component generates the corrected color image by correcting red pixel data, blue pixel data and green pixel data within the pixel data based on a weight matrix.

3. The tone mapping circuit of claim 1, wherein the noise removing component calculates the deviation of the input image by subtracting the mean value of the pixel data from each piece of the pixel data.

4. The tone mapping circuit of claim 1,
wherein the noise removing component is further suitable for:
calculating a deviation of the corrected color image, and
comparing the deviation of the input image and the deviation of the corrected color image with each other, and
wherein the noise removing component generates the output image when the deviation of the corrected color image is less than the deviation of the input image.

5. A tone mapping circuit, comprising:
a first tone mapping component configured to generate a primarily corrected color image by correcting pixel data representing an input image provided from a pixel array; and
a second tone mapping component configured to generate a secondarily corrected color image by secondarily correcting the primarily corrected color image based on the input image and the primarily corrected color image,
wherein the second tone mapping component is further configured to:
calculate a mean value of the pixel data,
calculate a deviation of the input image, and
calculate a mean value of the primarily corrected color image, and
wherein the second tone mapping circuit generates the secondarily corrected color image by adding the deviation of the input image to the mean value of the primarily corrected color image.

6. The tone mapping circuit of claim 5, wherein the first tone mapping component generates the primarily corrected color image by correcting red pixel data, blue pixel data and green pixel data within the input image based on a weight matrix.

7. The tone mapping circuit of claim 5, wherein the second tone mapping component secondarily corrects the primarily corrected color image by removing a noise from the primarily corrected color image.

8. The tone mapping circuit of claim 5, wherein the second tone mapping component calculates the deviation of the input image by subtracting the mean value of the pixel data from each piece of the pixel data.

9. The tone mapping circuit of claim 5,
wherein the second tone mapping component is further suitable for:
calculating a deviation of the primarily corrected color image, and
comparing the deviation of the input image and the deviation of the primarily corrected color image with each other, and
wherein the second tone mapping component generates the secondarily corrected color image when the deviation of the primarily corrected color image is less than the deviation of the input image.

10. A method for driving an image sensing device, comprising:
generating a corrected color image based on a weight matrix and pixel data representing an input image provided from a pixel array; and
generating an output image by removing a noise from the corrected color image based on the input image and the corrected color image,
wherein the generating the output image includes:
calculating a mean value of the pixel data;
calculating a deviation of the input image by subtracting the mean value of the pixel data from each piece of the pixel data;
calculating a mean value of the corrected color image; and
removing the noise from the corrected color image by adding the deviation of the input image to the mean value of the corrected color image.

11. An operating method of a tone mapping circuit, the operating method comprising:
generating a corrected array of pixel data based on a weight matrix and an original array of the pixel data;
calculating mean values of the respective original and corrected arrays;
generating a deviation array of the original array by subtracting the mean value of the original array from respective data pieces within the original array; and
generating an output array of the pixel data by summing the mean value of the corrected array to the deviation array and removing a noise from the corrected array.

* * * * *